(No Model.)
W. HODGES & J. H. ROBBINS.
FRYING PAN.
No. 557,126. Patented Mar. 31, 1896.
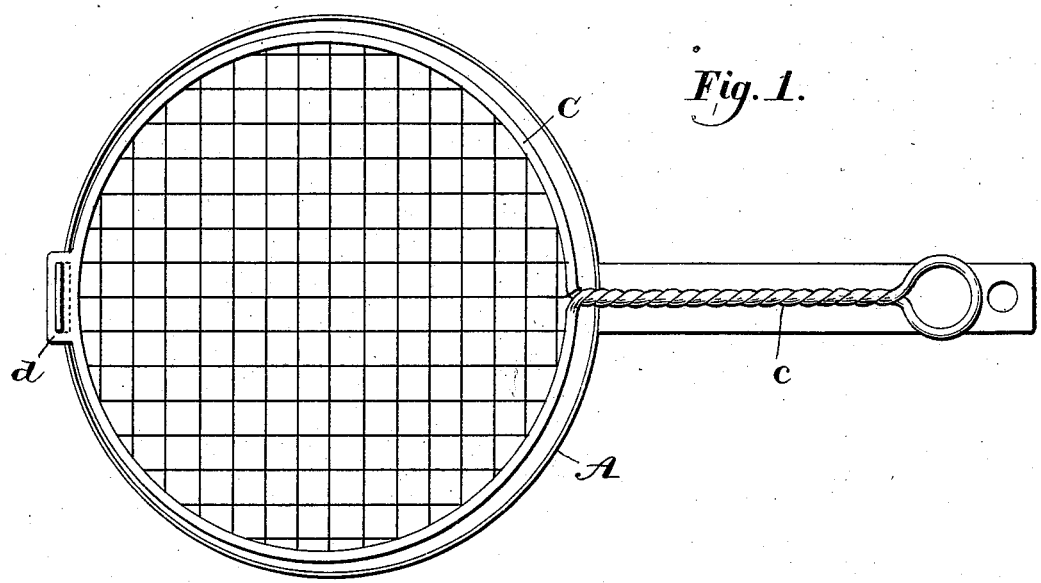
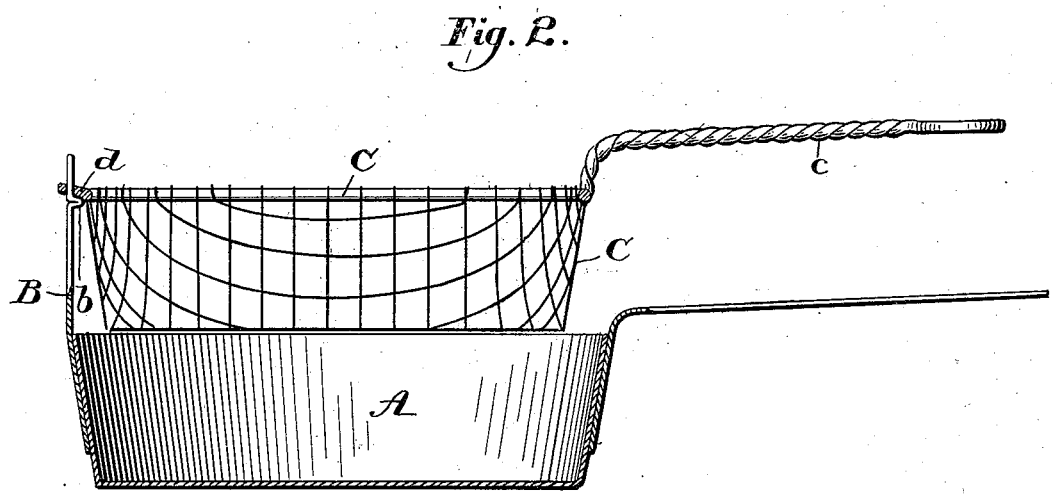
Witnesses.
Fred'k J. Lambert
E. Fable
Inventors
William Hodges
John H. Robbins
by Thomas S. Mould
their Attorney.
ANDREW B GRAHAM. PHOTO-LITHO. WASHINGTON, D.C.

UNITED STATES PATENT OFFICE.

WILLIAM HODGES AND JOHN H. ROBBINS, OF PHILADELPHIA, PENNSYLVANIA.

FRYING-PAN.

SPECIFICATION forming part of Letters Patent No. 557,126, dated March 31, 1896.

Application filed November 15, 1895. Serial No. 569,075. (No model.)

*To all whom it may concern:*

Be it known that we, WILLIAM HODGES and JOHN H. ROBBINS, citizens of the United States, residing at Philadelphia, in the county of Philadelphia and State of Pennsylvania, have invented certain new and useful Improvements in Frying-Pans; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to frying-pans that are used in connection with a perforated or sieve-like receptacle movably supported over the top of the pan for the purpose of allowing any surplus fat to drain off when frying oysters and similar articles of food.

Heretofore pans used for frying oysters and similar articles have been made with a gooseneck attachment provided with a hook on the outer end thereof. From this hook the perforated receptacle containing the articles that had been fried was suspended by a bail. While this arrangement is all that could be desired for the purpose of allowing the fat to drain off the articles it is cumbersome and top-heavy and besides somewhat dangerous. The perforated receptacle being loosely hung over the pan, on the slightest movement of either vessel the perforated receptacle would swing back and forward throwing the dripping fat or oil upon the hot stove or range, where it would catch fire and probably convey the flame to the main body of fat in the frying-pan.

The object of our improvement is to avoid this danger and at the same time make a light and rigid support for the perforated receptacle.

In the accompanying drawings, Figure 1 is a plan view of our improved frying-pan having a wire basket supported over the top. Fig. 2 is a vertical section of the pan and basket.

A is a frying-pan of the ordinary construction and provided with a suitable handle.

B is a flat support or upright fastened to the side of the pan directly opposite to the handle.

*b* is a stop or projection formed on the support B.

C is a wire basket made small enough to fit into the pan A.

*c* is the handle on the basket.

*d* is a rectangular loop formed on the basket directly opposite to the handle. This loop is made just large enough to fit snugly over the flat support B fastened on the pan.

In using the pan for frying the wire basket containing the articles to be cooked is removed from the support and set down into the pan, with the loop *d* on one side resting on the upper edge of the pan and the handle *c* on the opposite edge of the pan. When the food has been cooked, the basket is raised by the handle and the loop *d* fitted over the flat support B. The projection or stop *b* will limit the distance that said loop will go down over the support and the basket will be held rigidly over the pan with no liability of swinging back and forward.

Although we have shown a stop *b* on the upright B it is apparent that it is not absolutely necessary to the proper working of the device, for the sides of the loop *d*, which fit snugly to the upright, would, when the handle of the basket is released, tilt and bind against the sides of the upright, thereby holding said basket at any point between the top and bottom of the said upright.

Having thus described our invention, what we claim as new, and desire to secure by Letters Patent, is—

1. The combination of the frying-pan having the support B, with the basket C, having the loop *d*, and handle *c*, substantially as shown.

2. The pan A, provided with a flat support

B, having thereon the stop $b$, in combination with the basket C, having handle $c$, and loop $d$, adapted to fit over the support, all substantially as described.

3. The imperforate pan A adapted to contain liquid fat and having thereon the support B, in combination with the basket C, having on the upper edge thereof the loop $d$ and the handle $c$, the said basket being adapted to fit inside the pan and of sufficient depth to allow the contents thereof to be immersed in the fat when the basket is lowered into the pan, substantially as and for the purpose described.

In testimony whereof we affix our signatures in presence of two witnesses.

WILLIAM HODGES.
JOHN H. ROBBINS.

Witnesses:
H. B. ASHMEAD,
P. STRASSNER, Jr.